United States Patent [19]
De Livois

[11] 3,783,684
[45] Jan. 8, 1974

[54] FUEL GAS FLOW-METER CORRECTOR EQUIPMENT FOR GASES HAVING VARIABLE CHARACTERISTICS

[75] Inventor: Guy Baudelet De Livois, Paris, France

[73] Assignee: Controle Bailey (Societe Anonyme), Clamart, France

[22] Filed: Mar. 20, 1972

[21] Appl. No.: 236,255

[30] Foreign Application Priority Data
Apr. 2, 1971  France .............................. 71.11674

[52] U.S. Cl. ................................................. 73/190
[51] Int. Cl. ........................................... G01e 17/00
[58] Field of Search .............................. 73/190, 113

[56] References Cited
UNITED STATES PATENTS
3,393,562   7/1968   Breedlove ........................ 73/190 R
3,422,675   1/1969   Shannon et al. .................. 73/190 R Primary Examiner—Richard C. Queisser
Assistant Examiner—Arthur E. Korkosz
Attorney—Joseph M. Maguire

[57] ABSTRACT

Corrector equipment for converting gas flow rate measurements into heat flow measurements in a fuel gas distribution network using gas or gas mixture having variable characteristics and including a plurality of user stations branched on the general piping of said network, each of said stations including a gas admission valve, a diaphragm inserted upflow of said valve and a differential pressure gauge connected with said diaphragm. The equipment comprises a calorimetric oven gas-supplied from said network through a pipe, a regulator valve inserted on said pipe and controlled by a regulator system so as to keep the heat flow in said oven at a constant value, a further diaphragm inserted on said pipe and a further differential pressure gauge connected with said further diaphragm, said further pressure gauge delivering a signal $\Delta P'$, means for keeping the temperature and pressure of the gas supplied at any instant to all of said diaphragms at common constant values, and calculation means for deriving from said signal and from the flow rates $\Delta P_1$, $\Delta P_2$, . . . measured by said differential pressure gauges in each one of said stations quantities proportional to $\sqrt{\Delta P_1/\Delta P'}$, $\sqrt{\Delta P_2/\Delta P'}$, . . . and representing respectively the actual heat flow rates in each one of said stations.

1 Claim, 1 Drawing

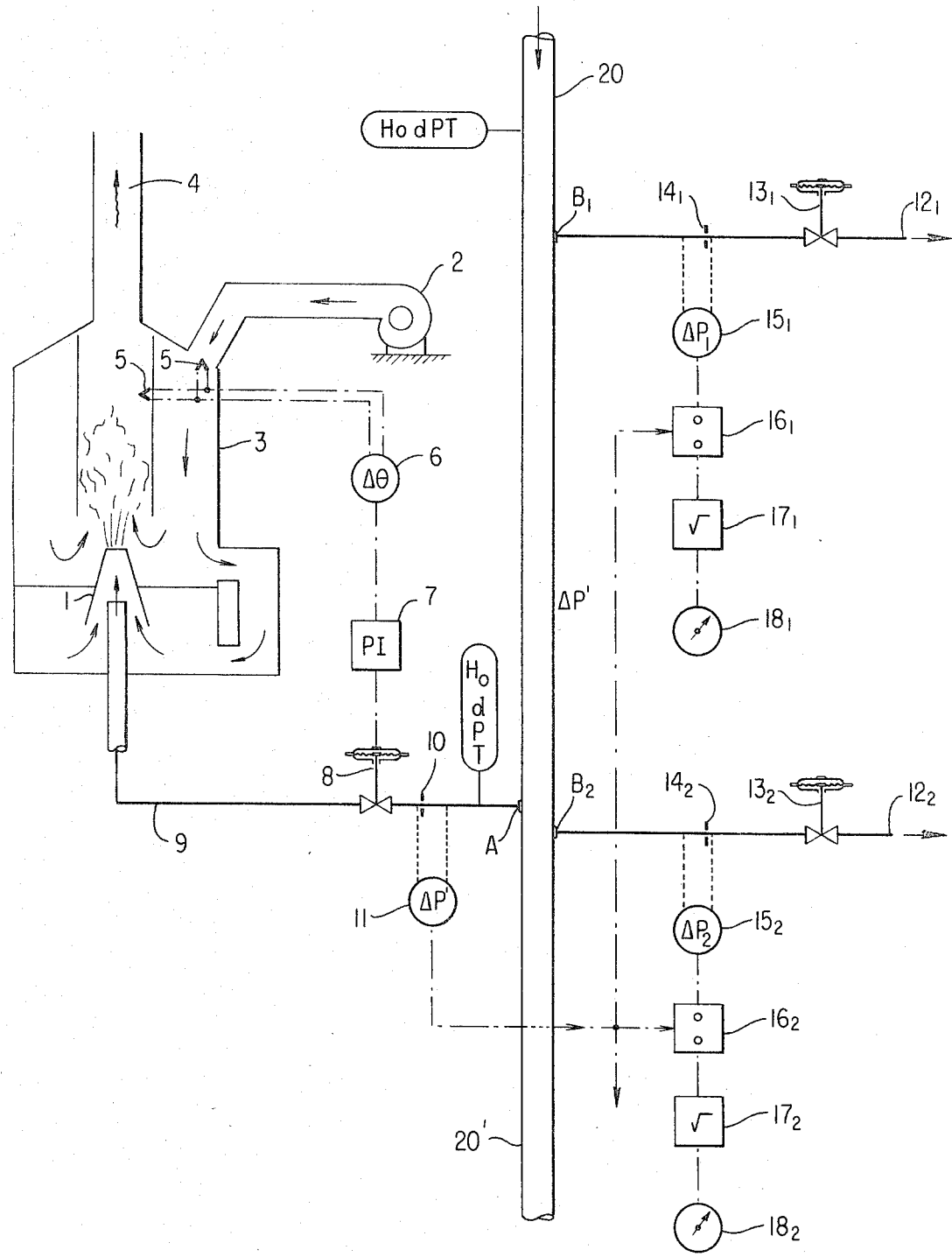

FUEL GAS FLOW-METER CORRECTOR EQUIPMENT FOR GASES HAVING VARIABLE CHARACTERISTICS

This invention relates to corrector equipments for flow meters for fuel gases used, for example, for heating of industrial furnaces and having variable characteristics (heating power, density, pressure, temperature) that can rapidly change in time, as frequently occurs in various industries in the chemical and petroleum lines.

It is known that gas flow meters applying Bernouilli's law are differential pressure gauges that measure pressure differences on either side of a calibrated aperture or orifice, a square root extractor converting the differential pressure measurement into a quantity proportional to the value of the flow. Of course, it is assumed that the compressibility of the gas is low with respect to the differential pressures thus obtained and that Bernouilli's law may be unconditionally applied.

However, to convert such a simple flow measurement into that of a heat flow, it is necessary to correct it by making allowances for the variations of the various factors hereinabove mentioned, which in turn at least partly result from the variations in the nature of the gas or in the composition of the gas mixture used as a fuel.

It is recalled that the heat flow F of a fuel gas or gas mixture has the following general expression:

$$F = aS \sqrt{(2/m_o)(T_o/P_o)} \sqrt{\Delta P (H_o/\sqrt{d})} \sqrt{P/T} \quad (1)$$

where:
$a$ is the flow coefficient of the restricted measuring orifice;
$S$ the free passage section of the said orifice;
$m_o$ the specific gravity of the air under normal temperature and pressure conditions;
$P_o$ the normal value of the absolute pressure;
$T_o$ the normal value of the absolute temperature;
$\Delta P$ the differential pressure created by the said orifice;
$H_o$ the lower heating power value per volume unit of the considered gas under normal pressure and temperature consitions;
$d$ density of this gas relative to the air;
$P$ actual absolute pressure of this gas;
$T$ actual absolute temperature of this gas.

If all the constant terms in expression (1) are grouped into a single constant K, the value of which depends on the units selected, this expression (1) becomes:

$$F = K \sqrt{\Delta P (H_o/\sqrt{d})} \sqrt{P/T} \quad (2)$$

which shows that the heat flow is, except for a constant factor, the product of:
a first factor $\sqrt{\Delta P}$ which can be measured by a conventional differential pressure gauge and represents the gas flow; and
a second factor $H_o \sqrt{P/d.T}$ that will be termed, in the following, "flowing heat power."

Amongst the various known solutions proposed for the initially defined problem, the following ones may be mentioned.

A so-called wobbmeter is used, which unit determines the quantity $H_o/\sqrt{d}$ termed the "Wobbe index." However, the procedure makes it necessary to complete the correction with pressure and temperature corrections.

A calorimetric oven is used in which the actual gas or gas mixture is admitted under the same pressure and temperature conditions as those of delivery to user stations, and the flowing heat power $(H_o/\sqrt{d}) \times \sqrt{P/T}$ is kept constant by acting on the general gas pressure $P$ in the system (or on its temperature $T$). However, it is not always possible to make this pressure (or this temperature) vary within limits that are compatible with the keeping of the just-mentioned quantity at a constant value.

Another method, which is also linked with the compulsory use of a regulation system installed by the user, may be described as follows. Again, a calorimetric oven of the same type as that already mentioned is used and the heat flow of the gas burning therein is maintained constant by automatically controlling the admission valve to the burner. A diaphragm placed down-flow of this valve creates a differential pressure $\Delta P'$ that is measured. Furthermore, each fuel gas user station (oven or firebox) is equipped with an automatic regulation system essentially consisting of a gas admission valve to the burners provided in this user station and a diaphragm placed down-flow therewith, the system creating a differential pressure $\Delta P_1$ which is a function of the flow. The regulation chain operates the admission valve to the user station to maintain the ratio $\Delta P_1/\Delta P'$ constant.

Furthermore, it will be observed, firstly, that the latter system assumes the existence of a regulation system at each user station and consequently is not, as such, a flow measurement corrector, and secondly and above all, that the pressure and temperature conditions of the gas at the measuring orifice of the calorimetric oven and at the orifice of the user station are not the same, which makes the validity of the comparison questionable.

The purpose of this invention is to obviate the drawbacks that have thus been recalled and to offer a system making it possible to generate a single corrective signal for all the user stations, allowance being made, at every instant, for the flowing heat power value of the gas used and the system being applicable to the flow meters in all the user stations receiving the gas from a common distribution network in the same instantaneous pressure and temperature conditions.

For this purpose, according to the invention, there is provided, in a general fuel gas distribution network, a combustible gas or gas mixture heat flow meter corrector unit for gases or mixtures having variable characteristics (heating power value, density, pressure, temperature) including a calorimetric oven supplied with controlled flow combustible gas in such a manner that the heat flow of the gas burning in the said calorimetric oven be maintained at a constant and predetermined value by means of a valve driven by a regulator system, and characterized in that the said unit, or the said valve is inserted in a pipe branched on the piping of the said general network solely to supply the said calorimetric oven, and that the said unit further includes a diaphragm placed upflow of the said valve on the same calorimetric oven pipe and a differential pressure gauge connected with said diaphragm and generating a signal $\Delta P'$; the said signal $\Delta P'$ being a uniquely determined function of the actual flowing heating power value of said gas or mixture and being used for the transformation of the indications of the individual flows $\sqrt{\Delta P_1}$, $\sqrt{\Delta P_2}$, ... measured by differential pressure gauges each connected with a corresponding further diaphragm provided in each one of a plurality of user stations and inserted upflow of a control valve feeding the said one of said stations, into heat power flow indications $\sqrt{\Delta P_1/\Delta P'}$, $\sqrt{\Delta P_2/\Delta P'}$, ... subject to the condition that arrangements be taken for keeping at any instant the gas temperature and pressure at equal values for the gas delivered to the calorimetric oven diaphragm and that delivered to the said diaphragms inserted upflow of the said control valves in each of the said user stations.

Under these conditions, as a matter of fact, the heating power flow of the gas delivered to the calorimetric oven has the following expression:

$$F' = a'S' \sqrt{(2/m_o)(T_o/P_o)} \sqrt{\Delta P'} (H_o/\sqrt{d}) \sqrt{P/T} \quad (3)$$

which expression only differs from that given by (1) by the following terms:

$a'$ flow coefficient of the restricted measuring orifice associated with the calorimatric oven;

$S'$ free passage section of this orifice;

$\Delta P'$ differential pressure created by the orifice.

In such conditions, the pressure P and temperature T of the gas delivered to the calorimetric oven orifice have the same values as those prevailing in the general system and, in particular, at the admission points to the diaphragms of the user stations.

If all the constant terms, including $F'$, are grouped into a single constant $K'$ the value of which depends on the units selected, expression (3) can be written as follows:

$$H_o \sqrt{P/d.T} = K'/\sqrt{\Delta P'} \quad (4)$$

which expression gives the wanted actual value of the flowing heat power.

By taking equation (2) relative to any user flow meter in service and by replacing therein the flowing heating power value by its value drawn from (4), the following equation is obtained:

$$F = K K' \sqrt{\Delta P/\Delta P'} \quad (5)$$

Therefore, thanks to the regulation equipment of the invention, a reference signal $\Delta P'$ is created by the value of which it suffices to divide the value of any one of the signals $\Delta P$ of the flow meters in service to make, after extraction of the square root of the quotients, these flow meters express heating power flows.

The invention, in particular, offers the following advantages:

by making the synthesis of all the terms entering into the expression of the flowing heating power value, it offers the most general solution to the initially raised problem; it is applicable, in actual fact, both to the case of heat flow indicators and/or recorders, for example for invoicing, and to flow meters used to check or regulate ovens or fireboxes;

the equipment, according to the invention, can be applied to an installation already in service without having to modify this installation.

The invention will be better understood from the hereinafter given description of a practical example of embodiment, made with reference to the attached drawing, in which the sole FIGURE is a diagram of a heating gas distribution intallation including equipment according to the invention.

In the system shown in the drawing, a burner 1, receiving the selected combustion gas heats, at a predetermined flow rate, air supplied by a constant speed fan 2. The air to be heated enters an outer casing 3 of a calorimetric oven, supplies the necessary oxidizer oxygen to the gas for its combustion and then mixes with the combustion products, thereby diluting them to generate smoke 4 which is thus at a certain relatively low temperature. Thermocouples 5 measure the temperature difference $\Delta\theta$ between the air which enters casing 3 and the smoke that escapes at 4. This temperature difference is generally taken as being of the order of approximately one hundred degrees centigrade.

The combustible gas flow delivered to the calorimetric oven burner is constantly adjusted by a regulation system so as to keep the temperature difference $\Delta\theta$ measured by the thermocouples at a constant value and consequently, since the air flow delivered by the fan is constant, also to keep the heating power flow of the gas arriving at the calorimetric oven burner at a constant value. The regulation system includes a temperature difference $\Delta\theta$ measuring unit 6 that emits a regulation signal to a proportional and integral effect (PI for short) regulator 7 of conventional type which actuates a valve 8 adjusting the fuel gas admission flow to the burner 1 of the calorimetric oven and inserted on a pipe 9 branched at A on the general system 20–20' solely to supply the calorimetric oven.

The equipment according to the invention is completed by the insertion, on the same pipe 9, provided solely for the calorimetric oven, and upflow of valve 8, of a diaphragm 10 and a differential pressure measurement unit 11 connected therewith.

Under such conditions, it must be remarked that the gas leaving the general network 20–20' at A toward the calorimetric oven orifice is the same as the gas that leaves this general network at $B_1$, $B_2$, ... respectively, to attain the orifices of the various user stations $12_1$, $12_2$, ... ; or, in other words, that all these gases have the same characteristics as to $H_o$, $d$, $P$ and $T$, i.e., for all such terms intervening in the expression of the flowing heating value.

Of course, this presupposes the fulfilling of the easy to obtain condition that the sample taking element of the actual gas at A be so designed as to keep the pressure P and temperature T parameters at uniform value at every instant, that is to say, in particular, that pipe 9 be well heat-insulated and does not cause abnormal pressure losses, diaphragm 10 being placed as close as possible to the sample taking point A.

Assuming this condition to be fulfilled, there is a signal $\Delta P'$ delivered by the equipment in accordance with the invention by the value of which it suffices, as shown by the hereinabove mathematical analysis, to divide the signals $\Delta P$ of the user station flow meters for making, after extraction of the square root of the quotients, these flow meters express heating power flows.

User stations $12_1$, $12_2$, ... consume actual gas at different flow rates that are fixed by the opening of valves $13_1$, $13_2$, ... ; upflow of these valves are inserted measuring diaphragms $14_1$, $14_2$ ... and differential pressure gauges $15_1$, $15_2$, ... undergoing differential pressures $\Delta P_1$, $\Delta P_2$, ....

Corrector signal $\Delta P'$ is transmitted to the outlet of the various pressure gauges $15_1$, $15_2$, ... to transform the corresponding signals $\Delta P_1/\Delta P'$, $\Delta P_2/\Delta P'$, ... into signals $\Delta P_1/\Delta P'$, $\Delta P_2/\Delta P'$ .... After extraction of the square roots of the latter, signals $\sqrt{\Delta P_1/\Delta P'}$, $\sqrt{\Delta P_2/\Delta P'}$, etc. are generated that are proportional to the heating power flows $F_1$, $F_2$, ... of the gas used by the various user stations.

The necessary calculation is performed by means of the divider equipment $16_1$, $16_2$, ... and square root extraction equipment $17_1$, $17_2$, ... of conventional types that do not form part of the invention. The calorific flows are displayed on flow meters $18_1$, $18_2$, ... etc.

What is claimed is:

1. In a piped fuel gas distribution network using gas or gas mixture having variable characteristics and including a plurality of user staions coupled through individual station pipes to the piping of said network, each of said stations receiving gas from the common distribution network in the same instantaneous pressure and temperature conditions, said stations each including a respective gas admission valve in said individual station pipe, a diaphragm inserted in said station pipe upflow of said valve and a differential pressure gauge connected with said diaphragm for producing individual differential pressure signals, a calorimetric oven gas-supplied from said network through an oven pipe, a regulator valve inserted in said oven pipe and responsive to temperature differences within said calorimetric oven to keep the heated flow in said oven at a constant value, a further diaphragm inserted in said oven pipe upflow of said regulator valve, and a further differential pressure gauge connected with said further diaphragm, said further pressure gauge delivering an oven pipe differential pressure signal, and ratio and square root circuit means for deriving from said oven pipe differential pressure signal and from the individual differential pressure signals measured by said differential pressure gauges in each one of said station pipes quantities that are proportional to the square root of the ratio of each station's differential pressure signal to said oven pipe differential signal that reflect the actual heat flow rates in each one of said stations, and means for representing respectively said actual heat flow rates in each one of said stations.

* * * * *